(12) United States Patent
Chang et al.

(10) Patent No.: US 7,952,987 B2
(45) Date of Patent: May 31, 2011

(54) APPARATUS AND METHOD FOR TRANSMITTING AND RECEIVING A SIGNAL IN A COMMUNICATION SYSTEM

(75) Inventors: Chung-Ryul Chang, Yongin-Si (KR); June Moon, Seoul (KR); Jae-Hee Cho, Seoul (KR); Ki-Young Han, Yongin-si (KR); Kwan-Hee Roh, Hwaseong-si (KR); Yong-Seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 12/012,354

(22) Filed: Jan. 31, 2008

(65) Prior Publication Data

US 2008/0181098 A1 Jul. 31, 2008

(30) Foreign Application Priority Data

Jan. 31, 2007 (KR) ........................ 10-2007-0010275

(51) Int. Cl.
*H04J 11/00* (2006.01)
(52) U.S. Cl. ...................................... 370/203
(58) Field of Classification Search .................. 370/210, 370/203; 375/260
See application file for complete search history.

(56) References Cited

U.S. PATENT DOCUMENTS

| | | | |
|---|---|---|---|
| 6,952,394 B1 | 10/2005 | Kim et al. | |
| 7,301,890 B2 | 11/2007 | Joo et al. | |
| 7,319,659 B2 * | 1/2008 | Tsuie | 370/203 |
| 7,680,200 B2 | 3/2010 | Kwun et al. | |
| 2005/0286409 A1 * | 12/2005 | Yoon et al. | 370/210 |
| 2006/0088007 A1 * | 4/2006 | Jalali et al. | 370/334 |
| 2006/0183440 A1 * | 8/2006 | Morris et al. | 455/103 |
| 2006/0250941 A1 * | 11/2006 | Onggosanusi et al. | 370/208 |
| 2007/0011555 A1 * | 1/2007 | Kim et al. | 714/749 |
| 2007/0104283 A1 * | 5/2007 | Han et al. | 375/260 |
| 2007/0133695 A1 * | 6/2007 | Kotzin | 375/260 |

FOREIGN PATENT DOCUMENTS

| | | |
|---|---|---|
| KR | 10-2000-0074720 A | 12/2000 |
| KR | 10-2003-0038289 A | 5/2003 |
| KR | 10-2006-0102185 A | 9/2006 |

* cited by examiner

*Primary Examiner* — Chi H Pham
*Assistant Examiner* — Fan Ng (57) ABSTRACT

A signal transmission apparatus in a communication system, includes: a first IFFT unit for generating a first signal by performing inverse fast Fourier transform on a first communication service signal corresponding to a first communication scheme; a first CP inserter for generating a second signal by inserting a first cyclic prefix having a length corresponding to the first communication scheme into the first signal; a second IFFT unit for generating a third signal by performing inverse fast Fourier transform on a second communication service signal corresponding to a second communication scheme; a second cyclic prefix inserter for generating a fourth signal by inserting a second cyclic prefix having a length corresponding to the second communication scheme into the third signal; and a transmission unit for multiplexing the second signal and the fourth signal and transmitting the multiplexed signals.

10 Claims, 7 Drawing Sheets

APPARATUS AND METHOD FOR TRANSMITTING AND RECEIVING A SIGNAL IN A COMMUNICATION SYSTEM

CROSS-REFERENCE TO RELATED APPLICATION(S) AND CLAIM OF PRIORITY

This application claims the priority under 35 U.S.C. §119 (a) of an application entitled "Apparatus And Method For Transmitting and Receiving A Signal In A Communication System" filed in the Korean Industrial Property Office on Jan. 31, 2007 and assigned Serial No. 2007-10275, the contents of which are hereby incorporated by reference.

TECHNICAL FIELD OF THE INVENTION

The present invention relates to an apparatus and a method for transmitting and receiving a signal in a communication system, and more particularly to an apparatus and a method for transmitting and receiving a signal in a communication system (OFDM and OFDMA communication system) using an Orthogonal Frequency Division Multiplexing (OFDM) and Orthogonal Frequency Division Multiple Access (OFDMA) scheme.

BACKGROUND OF THE INVENTION

Next generation communication systems are being developed in order to provide various high-speed large-capacity services to Mobile Stations (MSs), and are making use of the OFDM or OFDMA scheme into consideration. Hereinafter, structures of a signal transmission apparatus and a signal reception apparatus of a conventional OFDM or OFDMA communication system will be described with reference to FIGS. 1 and 2.

Figure 1:
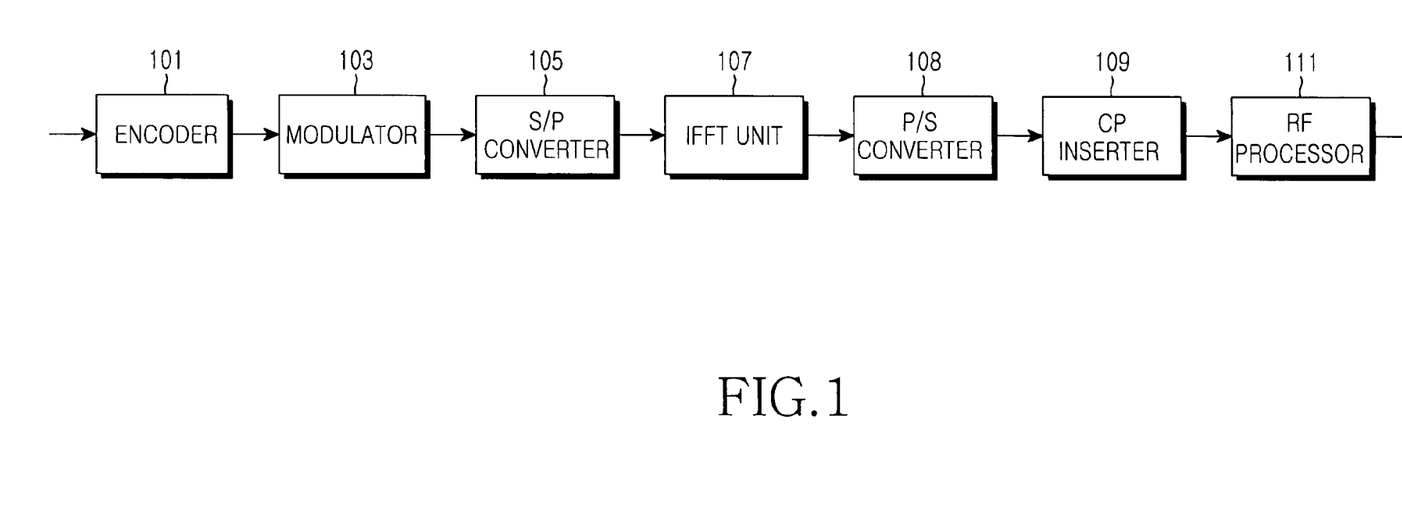
FIG. 1 is a block diagram illustrating a structure of a signal transmission apparatus of a conventional OFDM and OFDMA communication system.

FIG. 1 is a block diagram illustrating a structure of a signal transmission apparatus of a conventional OFDM/OFDMA communication system.

Referring to FIG. 1, the signal transmission apparatus includes an encoder 101, a modulator 103, a serial-to-parallel (S/P) converter 105, an Inverse Fast Fourier Transform (IFFT) unit 107, a parallel-to-serial converter 108, a Cyclic Prefix (CP) inserter 109, and a Radio Frequency (RF) processor 111.

First, when a signal to be transmitted occurs in the signal transmission apparatus, the signal is input to the encoder 101. The encoder 101 encodes the input signal according to a preset encoding scheme and then outputs the encoded signal to the modulator 103. The preset encoding scheme may be, for example, a turbo encoding scheme or a convolutional encoding scheme. The modulator 103 receives the signal output from the encoder 101, modulates the signal according to a preset modulation scheme, and then outputs the modulated signal to the S/P converter 105. The preset modulation scheme may be, for example, a Quadrature Amplitude Modulation (QAM) scheme, a Binary Phase Shift Key (BPSK) scheme, or a Quadrature Phase Shift Keying (QPSK) scheme.

The S/P converter 105 receives the serial signal output from the modulator 103, converts the serial signal to parallel signals, and then outputs the converted parallel signals to the IFFT unit 107. The IFFT unit 107 receives the parallel signals output from the S/P converter 105, performs IFFT on the parallel signals, and then outputs the IFFTed signals to the P/S converter 108. The P/S converter 108 converts the parallel signals output from the IFFT unit 107 to a serial signal, and then outputs the converted serial signal to the CP inserter 109. The CP inserter 109 inserts a CP to the serial signal output from the P/S converter 108 and then outputs the CP-inserted signal to the RF processor 111. The RF processor 111 receives the signal output from the CP inserter 109, performs RF processing of the signal, and then transmits the RF-processed signal through an antenna.

Figure 2:
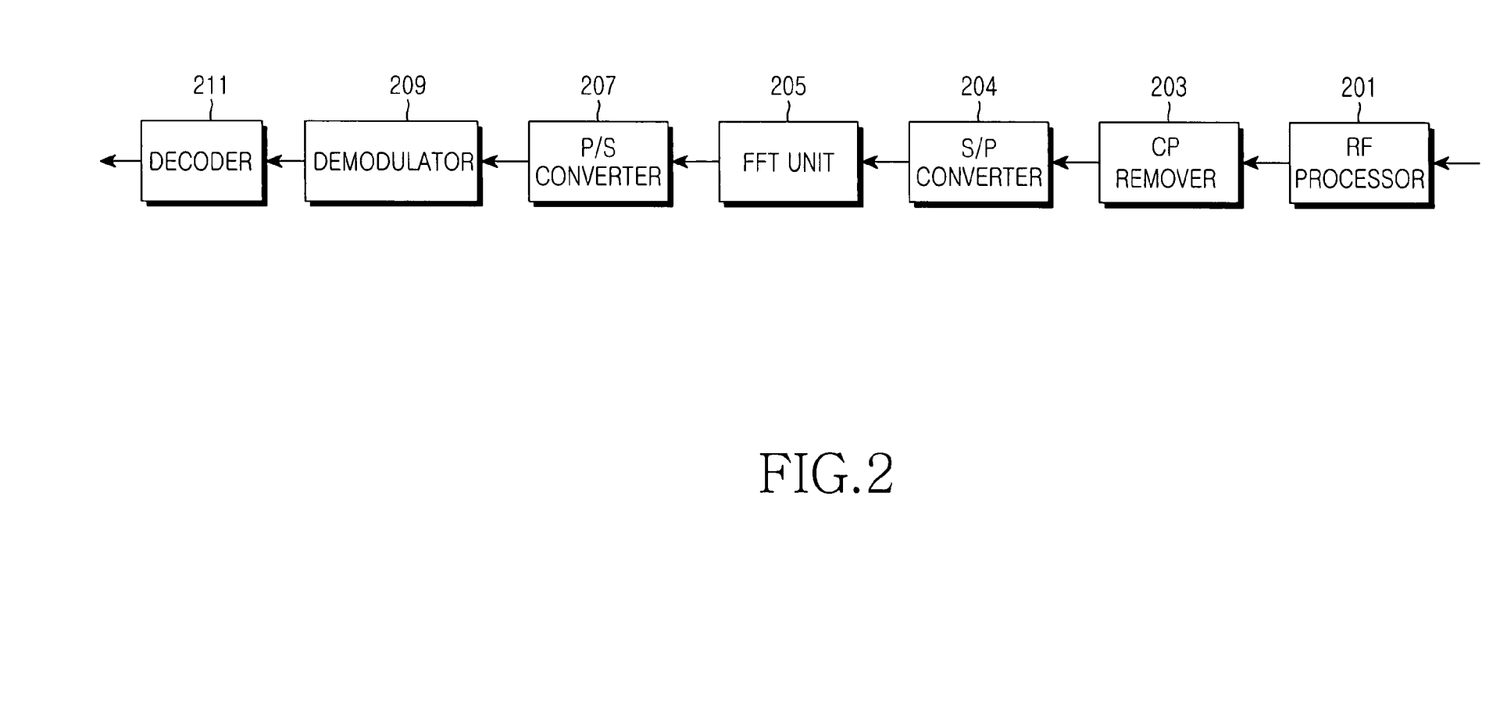
FIG. 2 is a block diagram illustrating a structure of a signal reception apparatus of a conventional OFDM and OFDMA communication system.

FIG. 2 is a block diagram illustrating a structure of a signal reception apparatus of a conventional OFDM and OFDMA communication system.

Referring to FIG. 2, the signal reception apparatus includes an RF processor 201, a CP remover 203, an S/P converter 204, a Fast Fourier Transform (FFT) unit 205, a P/S converter 207, a demodulator 209, and a decoder 211.

The RF processor 201 receives an RF signal from a signal transmission apparatus, restores an original signal before the RF processing from the received RF signal, and outputs the restored signal to the CP remover 203. The CP remover 203 receives the signal output from the RF processor 201, removes the CP from the signal, and then outputs the CP-removed signal to the S/P converter 204. The S/P converter 204 receives the serial signal output from the CP remover 203, converts the serial signal to parallel signals, and outputs the parallel signals to the FFT unit 205. The FFT unit 205 receives the parallel signals output from the S/P converter 204, performs FFT on the signals, and then outputs the FFTed signals to the P/S converter 207. The P/S converter 207 receives the parallel signals output from the FFT unit 205, converts them into a serial signal, and then outputs the converted serial signal to the demodulator 209. The demodulator 209 demodulates the signal output from the P/S converter 207 according to a demodulation scheme corresponding to a modulation scheme used in a signal transmission apparatus corresponding to the signal reception apparatus, and outputs the demodulated signal to the decoder 211. The decoder 211 decodes the signal output from the demodulator 209 according to a decoding scheme corresponding to an encoding scheme used in the signal transmission apparatus corresponding to the signal reception apparatus, and outputs the decoded signal.

Meanwhile, in order to provide various types of services, next generation communication systems are being developed in pursuit of broadband communication systems capable of providing a broadband service. Current broadband communication systems that have been proposed up to now are systems designed based on a basic assumption that broadband communication systems are allocated different frequency bands for providing the broadband service, respectively. In order to provide the broadband service through different frequency bands, each frequency band requires a signal transmission apparatus as shown in FIG. 1 and a signal reception apparatus as shown in FIG. 2, that is, as many signal transmission apparatuses of FIG. 1 and as many signal reception apparatuses of FIG. 2 as the number of used frequency bands are required, respectively. However, such multiple signal transmission apparatuses and signal reception apparatuses increase complexity in the hardware configuration.

SUMMARY OF THE INVENTION

To address the above-discussed deficiencies of the prior art, it is a primary object of the present invention to provide an apparatus and a method for transmitting and receiving a signal in a communication system.

Also, the present invention provides an apparatus and a method for transmitting and receiving a signal by using multiple frequency bands together.

In accordance with an aspect of the present invention, there is provided a signal transmission apparatus in a communication system, including: a first Inverse Fast Fourier Transform (IFFT) unit for generating a first signal by performing IFFT on a first communication service signal corresponding to a first communication scheme; a first Cyclic Prefix (CP) inserter for generating a second signal by inserting a first CP having a length corresponding to the first communication scheme into the first signal; a second IFFT unit for generating a third signal by performing IFFT on a second communication service signal corresponding to a second communication scheme; a second CP inserter for generating a fourth signal by inserting a second CP having a length corresponding to the second communication scheme into the third signal; and a transmission unit for multiplexing the second signal and the fourth signal and transmitting the multiplexed signals.

In accordance with another aspect of the present invention, there is provided a signal reception apparatus in a communication system, including: a reception unit for receiving an incoming signal and dividing the incoming signal into a first communication service signal corresponding to a first communication scheme and a second communication service signal corresponding to a second communication scheme; a first CP remover for generating a first signal by removing a first CP corresponding to the first communication scheme from the first communication service signal; a first Fast Fourier Transform (FFT) unit for performing FFT on the first signal; a second CP remover for generating a second signal by removing a second CP corresponding to the second communication scheme from the second communication service signal; and a second FFT unit for performing FFT on the second signal.

In accordance with another aspect of the present invention, there is provided a signal reception apparatus in a communication system, including: a reception unit for receiving an incoming signal and dividing the incoming signal into a first communication service signal corresponding to a first communication scheme and a second communication service signal corresponding to a second communication scheme; a first CP remover for generating a first signal by removing a first CP corresponding to the first communication scheme from the first communication service signal; a second CP remover for generating a second signal by removing a second CP corresponding to the second communication scheme from the second communication service signal; and an FFT unit for performing FFT on the first signal and the second signal.

In accordance with another aspect of the present invention, there is provided a signal reception apparatus in a communication system, including: a reception unit for receiving an incoming signal and dividing the incoming signal into a first communication service signal corresponding to a first communication scheme and a second communication service signal corresponding to a second communication scheme; a first band delay filter for generating a first signal by delaying the first communication service signal during a first time interval; a second band delay filter for generating a second signal by delaying the second communication service signal during a second time interval; a CP remover for generating a third signal by removing a first CP corresponding to the first communication scheme from the first signal and generating a fourth signal by removing a second CP corresponding to the second communication scheme from the second signal; and an FFT unit for performing FFT on the third signal and the fourth signal.

In accordance with another aspect of the present invention, there is provided a signal transmission method in a communication system, including the steps of: generating a first signal by performing IFFT on a first communication service signal corresponding to a first communication scheme by a first IFFT unit; generating a second signal by inserting a first CP having a length corresponding to the first communication scheme into the first signal by a first CP inserter; generating a third signal by performing IFFT on a second communication service signal corresponding to a second communication scheme by a second IFFT unit; generating a fourth signal by inserting a second CP having a length corresponding to the second communication scheme into the third signal by a second CP inserter; and multiplexing and transmitting the second signal and the fourth signal by a transmission unit.

In accordance with another aspect of the present invention, there is provided a signal reception method in a communication system, including the steps of: receiving an incoming signal and dividing the incoming signal into a first communication service signal corresponding to a first communication scheme and a second communication service signal corresponding to a second communication scheme by a reception unit; generating a first signal by removing a first CP corresponding to the first communication scheme from the first communication service signal by a first CP remover; performing FFT on the first signal by a first FFT unit; generating a second signal by removing a second CP corresponding to the second communication scheme from the second communication service signal by a second CP remover; and performing FFT on the second signal by a second FFT unit.

In accordance with another aspect of the present invention, there is provided a signal reception method in a communication system, including the steps of: receiving an incoming signal and dividing the incoming signal into a first communication service signal corresponding to a first communication scheme and a second communication service signal corresponding to a second communication scheme by a reception unit; generating a first signal by removing a first CP corresponding to the first communication scheme from the first communication service signal by a first CP remover; generating a second signal by removing a second CP corresponding to the second communication scheme from the second communication service signal by a second CP remover; and performing FFT on the first signal and the second signal by an FFT unit.

In accordance with another aspect of the present invention, there is provided a signal reception method in a communication system, including the steps of: receiving an incoming signal and dividing the incoming signal into a first communication service signal corresponding to a first communication scheme and a second communication service signal corresponding to a second communication scheme by a reception unit; generating a first signal by delaying the first communication service signal during a first time interval by a first band delay filter; generating a second signal by delaying the second communication service signal during a second time interval by a second band delay filter; generating a third signal by removing a first CP corresponding to the first communication scheme from the first signal and generating a fourth signal by removing a second CP corresponding to the second communication scheme from the second signal by a CP remover; and performing FFT on the third signal and the fourth signal by an FFT unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

The present invention proposes an apparatus and a method for transmitting and receiving a signal in a communication system (OFDM and OFDMA communication system) using an Orthogonal Frequency Division Multiplexing (OFDM) or Orthogonal Frequency Division Multiple Access (OFDMA) scheme. For convenience of description, the following description employs a communication system (LBC communication system) using a Loosely Backward Compatibility (LBC) scheme as an example of the OFDM/OFDMA communication system. The LBC communication system refers to a communication system for either providing a communication system according to a legacy scheme and a new scheme or providing a communication system according to a Strictly Backward Compatibility (SBC) scheme and a new scheme. Further, the LBC communication system uses the same frequency band when providing a communication system according to the legacy scheme and when providing a communication system according to the SBC scheme. In the present invention, for convenience of description, it is assumed that the LBC communication system is a system providing a communication service according to the SBC scheme and the new scheme, a communication service according to the SBC scheme is called an "SBC communication service," and a communication service according to the new scheme is called an "new communication service."

Further, the SBC frequency band, which is used in providing the SBC communication service, is named "band #1," and the new frequency band, which is used in providing the new communication service, is named "band #2." Moreover, a Mobile Station (MS) providing only the SBC communication service is called an "SBC MS," and an MS providing the LBC communication service is called an "LBC MS." The SBC MS can transmit and receive a signal through only band #1, and the LBC MS can transmit and receive a signal through both band #1 and band #2.

Further, it is assumed that a Cyclic Prefix (CP) used in the SBC scheme has a length different from that of a CP used in the LBC scheme. Moreover, it is assumed that a guard band between band #1 and band #2 has a size that corresponds to a multiple of an OFDM sub-carrier interval.

Figure 3:
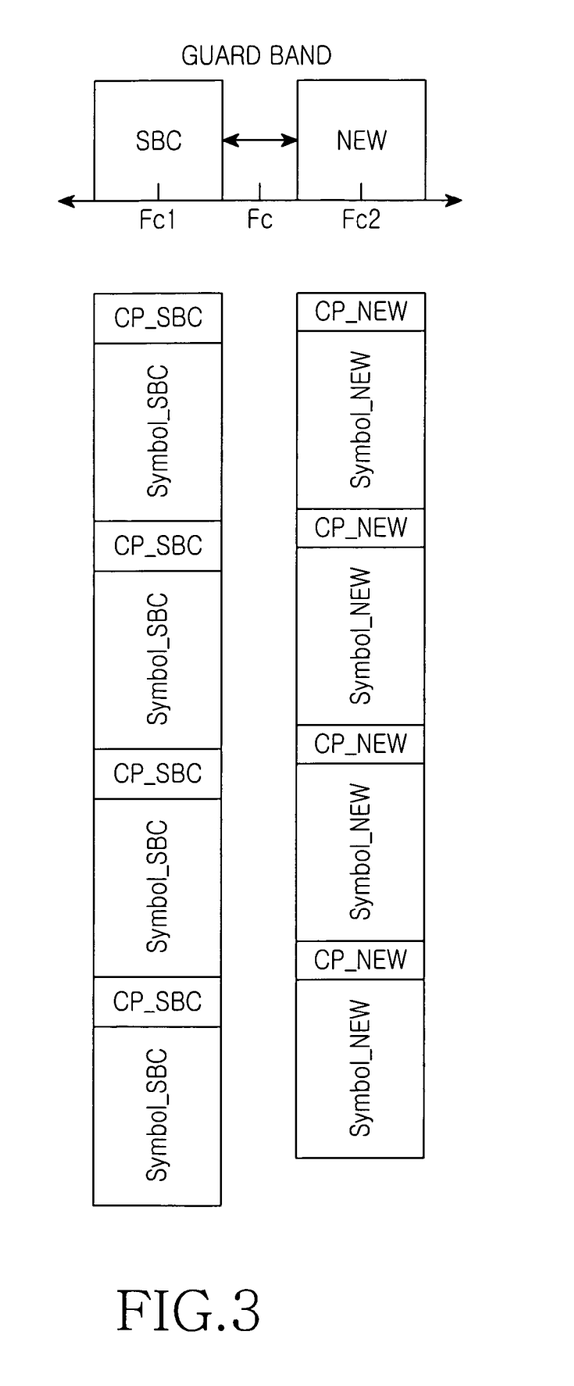
FIG. 3 illustrates a structure of an OFDM signal of an LBC communication system according to an embodiment of the present invention.

FIG. 3 illustrates a structure of an OFDM signal of an LBC communication system according to an embodiment of the present invention.

Referring to FIG. 3, the Fc1 band corresponds to the SBC frequency band, i.e. band #1, and the Fc2 band corresponds to the new frequency band, i.e. band #2 (note that the SBC frequency band is marked "SBC" and the new frequency band is marked "NEW" in FIG. 3). Further, the Fc band refers to the entire frequency band including the Fc1 band, the Fc2 band, and the guard band between the Fc1 band and the Fc2 band. In addition, the length of the CP for the SBC communication service and the length of the CP for the new communication service are different from each other. FIG. 3 shows an example in which the length of the CP for the SBC communication service is longer than the length of the CP for the new communication service.

Next, structures of a signal transmission apparatus and a signal reception apparatus of an LBC communication system according to an embodiment of the present invention will be described with reference to FIGS. 4 to 7.

Figure 4:
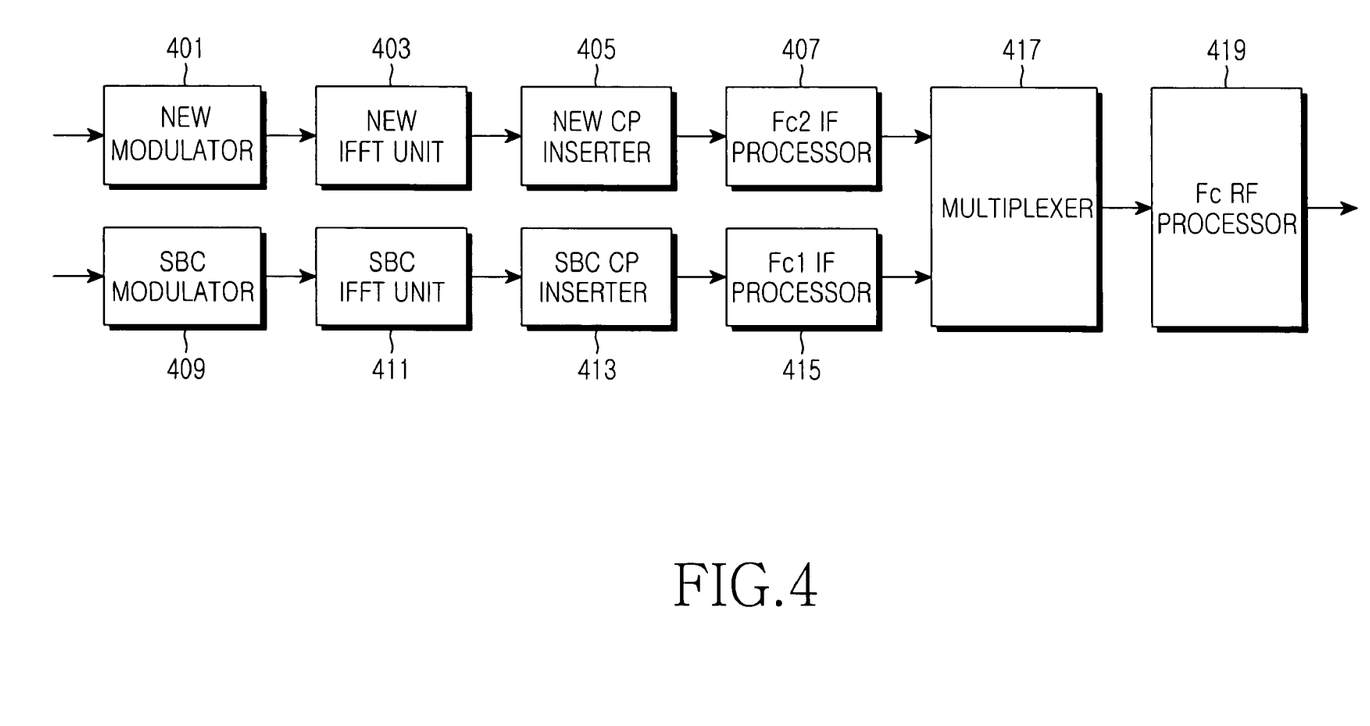
FIG. 4 is a block diagram illustrating a structure of a signal transmission apparatus in an LBC communication system according to an embodiment of the present invention.

FIG. 4 is a block diagram illustrating a structure of a signal transmission apparatus in an LBC communication system according to an embodiment of the present invention.

Referring to FIG. 4, the signal transmission apparatus includes a new modulator 401, a new IFFT unit 403, a new CP inserter 405, an Fc2 Intermediate Frequency (IF) processor 407, an SBC modulator 409, an SBC IFFT unit 411, an SBC CP inserter 413, an Fc1 IF processor 415, a multiplexer 417, and an Fc RF processor 419.

First, a new communication service signal generated in the signal transmission apparatus is input to the new modulator 401. The new modulator 401 modulates the new communication service signal according to a preset modulation scheme and outputs the modulated signal to the new IFFT unit 403. The preset modulation scheme may be, for example, a QAM scheme, a BPSK scheme, or a QPSK scheme.

The new IFFT unit 403 receives the signal output from the new modulator 401, performs IFFT on the signal, and then outputs the IFFTed signal to the new CP inserter 405. The new CP inserter 405 inserts a CP in the signal output from the new IFFT unit 403 and then outputs the CP-inserted signal to the Fc2 IF processor 407. The Fc2 IF processor 407 receives the signal output from the new CP inserter 405, IF-processes the signal for the Fc2 band, and then outputs the IF-processed signal to the multiplexer 417.

Meanwhile, when an SBC communication service signal to be transmitted is generated in the signal transmission apparatus, the SBC communication service signal is input to the SBC modulator 409. The SBC modulator 409 modulates the SBC communication service signal according to a modulation scheme corresponding to the modulation scheme used by the new modulator 401 and then outputs the modulated signal to the SBC IFFT unit 411. The SBC IFFT unit 411 receives the signal output from the SBC modulator 409, performs IFFT on the signal, and then outputs the IFFTed signal to the SBC CP inserter 413. The SBC CP inserter 413 inserts a CP in the signal output from the SBC IFFT unit 411 and then outputs the CP-inserted signal to the Fc1 IF processor 415. The Fc1 IF processor 415 receives the signal output from the SBC CP inserter 413, IF-processes the signal for the Fc1 band, and then outputs the IF-processed signal to the multiplexer 417.

The multiplexer 417 receives the signals output from the Fc2 IF processor 407 and the Fc1 IF processor 415, multiplexes the two input signals, and then outputs the multiplexed signal to the Fc RF processor 419. The Fc RF processor 419 receives the signal output from the multiplexer 417, RF-processes the signal for the Fc band, and then transmits the RF-processed signal to a signal reception apparatus through an antenna.

In the signal transmission apparatus according to an embodiment of the present invention as shown in FIG. 4, the CP inserted by the new CP inserter 405 and the CP inserted by the SBC CP inserter 413 have different lengths, in order to improve the efficiency and performance of the system.

Figure 5:
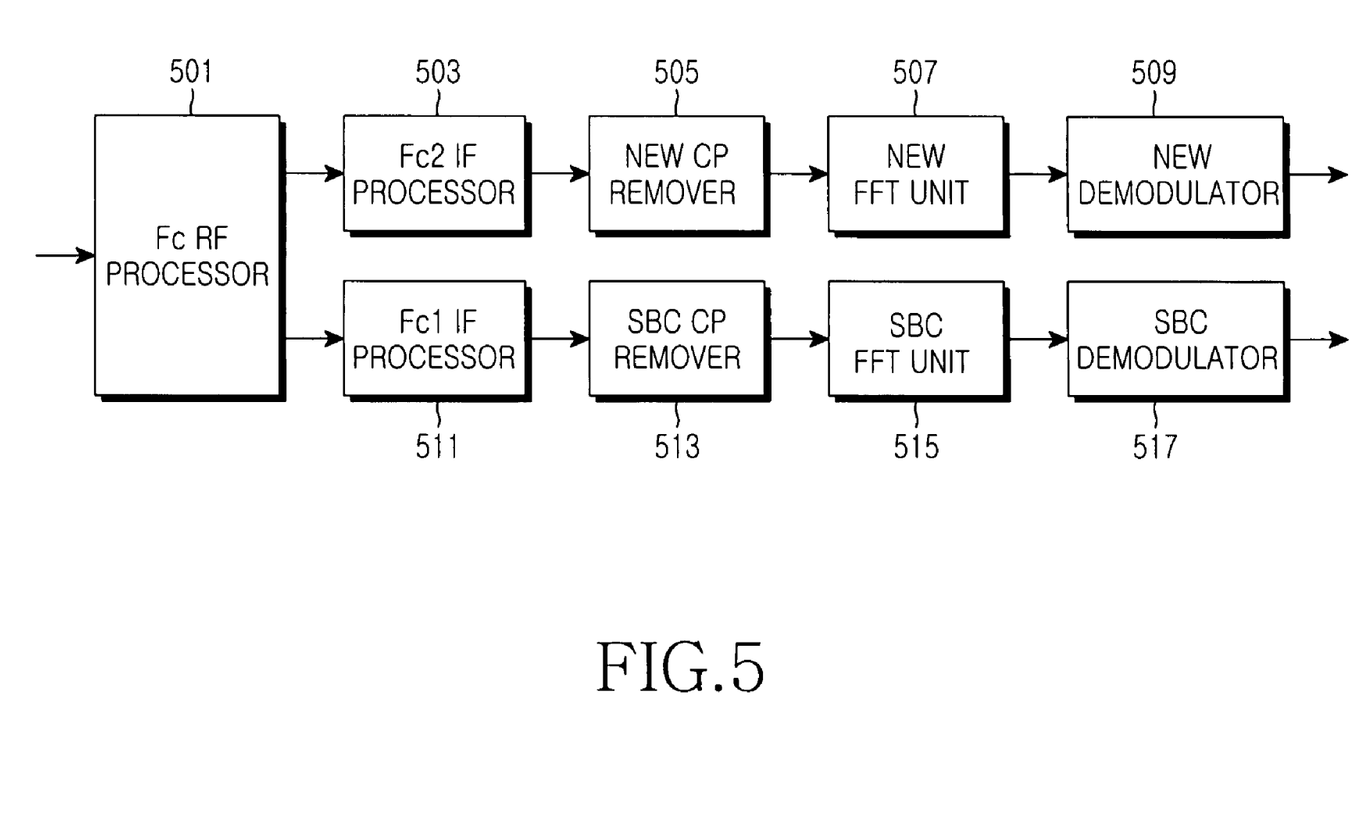
FIG. 5 is a block diagram illustrating a structure of a signal reception apparatus in an LBC communication system according to a first embodiment of the present invention.

FIG. 5 is a block diagram illustrating a structure of a signal reception apparatus in an LBC communication system according to a first embodiment of the present invention.

Referring to FIG. 5, the signal reception apparatus includes an Fc RF processor 501, an Fc2 IF processor 503, a new CP remover 505, a new FFT unit 507, a new demodulator 509, an Fc1 IF processor 511, an SBC CP remover 513, an SBC FFT unit 515, and an SBC demodulator 517.

The Fc RF processor 501 receives a signal from a signal transmission apparatus, RF-processes the signal for an Fc band, and then outputs the RF-processed signal to the Fc2 IF processor 503 and the Fc1 IF processor 511. The Fc2 IF processor 503 receives the Fc2 band signal output from the Fc RF processor 501, IF-processes the Fc2 band signal, separates a new communication service signal from the Fc2 band signal, and then outputs the separated new communication service signal to the new CP remover 505. The new CP remover 505 removes the CP from the signal output from the Fc2 IF processor 503 and then outputs the CP-removed signal to the new FFT unit 507. The new FFT unit 507 receives the signal output from the new CP remover 505, performs FFT on the signal, and then outputs the FFTed signal to the new demodulator 509.

In the meantime, the Fc1 IF processor 511 receives the Fc1 band signal output from the Fc RF processor 501, IF-processes the Fc1 band signal, separates an SBC communication service signal from the Fc1 band signal, and then outputs the separated SBC communication service signal to the SBC CP remover 513. The SBC CP remover 513 removes the CP from the signal output from the Fc1 IF processor 511 and then outputs the CP-removed signal to the SBC FFT unit 515. The SBC FFT unit 515 receives the signal output from the SBC CP remover 513, performs FFT on the signal, and then outputs the FFTed signal to the SBC demodulator 517.

In the signal reception apparatus as shown in FIG. 5, the SBC communication service signal and the new communication service signal are separately processed as described above. Therefore, even though the two signals have CPs of different lengths, there is no inter-channel interference (ICI) between the two signals.

Figure 6:
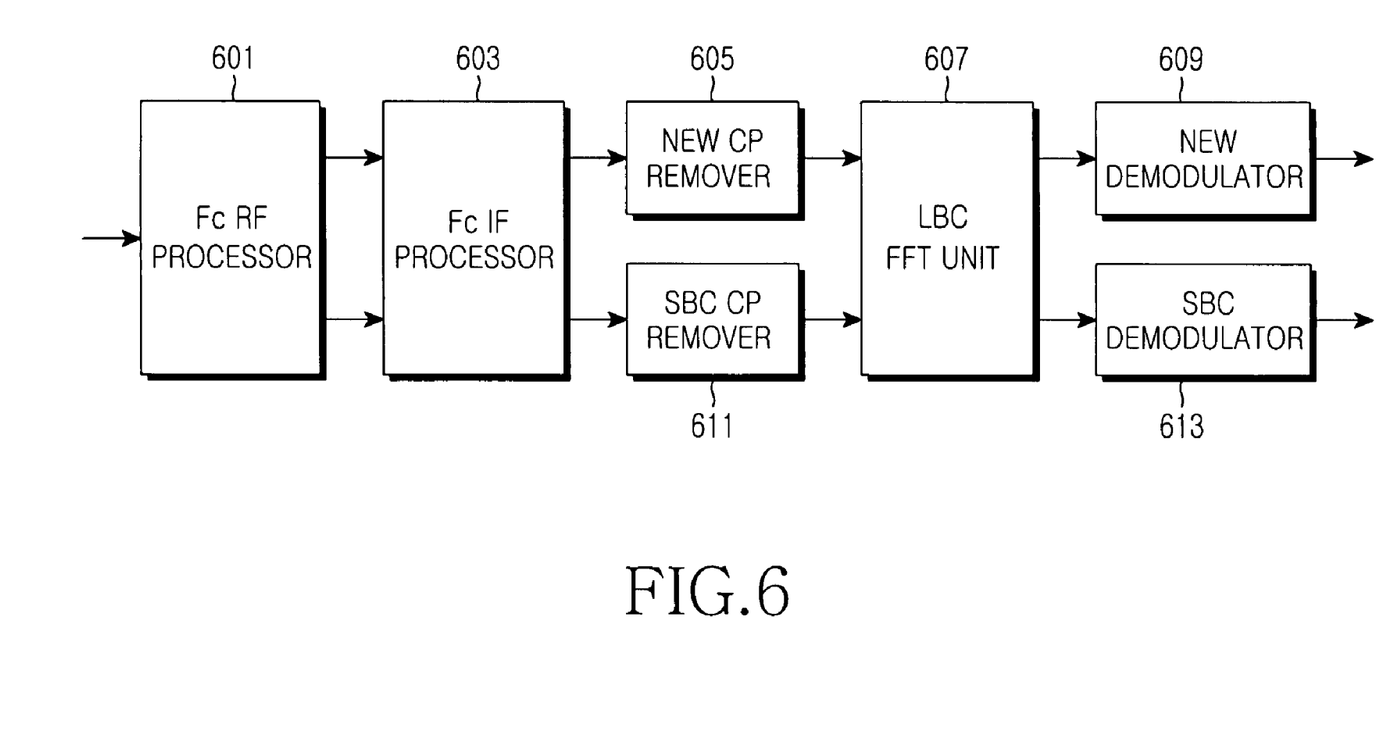
FIG. 6 is a block diagram illustrating a structure of a signal reception apparatus in an LBC communication system according to a second embodiment of the present invention.

FIG. 6 is a block diagram illustrating a structure of a signal reception apparatus in an LBC communication system according to a second embodiment of the present invention.

Referring to FIG. 6, the signal reception apparatus includes an Fc RF processor 601, an Fc IF processor 603, a new CP remover 605, an LBC FFT unit 607, a new demodulator 609, an SBC CP remover 611, and an SBC demodulator 613.

The Fc RF processor 601 receives a signal from a signal transmission apparatus, RF-processes the received signal for an Fc band, and then outputs the RF-processed signal to the Fc IF processor 603. The Fc IF processor 603 receives the signal output from the Fc RF processor 601, IF-processes the signal for the Fc band, divides the IF-processed signal into a new communication service signal and an SBC communication service signal, and outputs the new communication service signal to the new CP remover 605 and the SBC communication service signal to the SBC CP remover 611. The new CP remover 605 removes the CP from the new communication service signal output from the Fc IF processor 603, and outputs the CP-removed signal to the LBC FFT unit 607. Meanwhile, the SBC CP remover 611 removes the CP from the SBC communication service signal output from the Fc IF processor 603, and outputs the CP-removed signal to the LBC FFT unit 607. The LBC FFT unit 607 receives the signals output from the new CP remover 605 and the SBC CP remover 611, performs FFT on the signals, and then outputs the new communication service signal to the new demodulator 609 and the SBC communication service signal to the SBC demodulator 613. The new demodulator 609 demodulates the new communication service signal output from the LBC FFT unit 607. The SBC demodulator 613 demodulates the SBC communication service signal output from the LBC FFT unit 607.

The signal reception apparatus as described above employs a single LBC FFT unit 607 instead of employing multiple FFT units corresponding to different frequency bands. The LBC FFT unit 607 has a size corresponding to used frequency bands. Further, the LBC FFT unit 607 performs the FFT two times because the LBC FFT unit 607 should separately process the received signals, that is, the new communication service signal and the SBC communication service signal.

Figure 7:
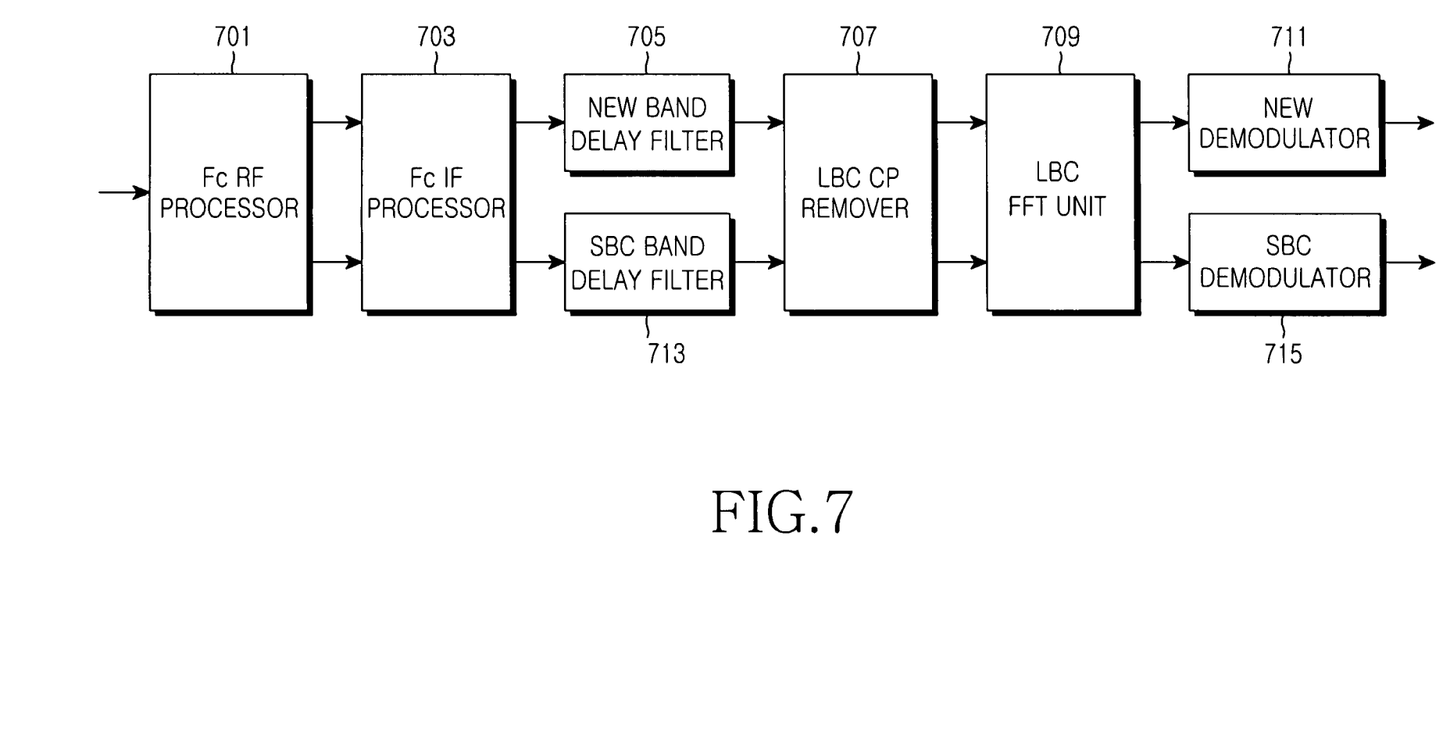
FIG. 7 is a block diagram illustrating a structure of a signal reception apparatus in an LBC communication system according to a third embodiment of the present invention.

FIG. 7 is a block diagram illustrating a structure of a signal reception apparatus in an LBC communication system according to a third embodiment of the present invention.

Referring to FIG. 7, the signal reception apparatus includes an Fc RF processor 701, an Fc IF processor 703, a band delay filter 705, an LBC CP remover 707, an LBC FFT unit 709, a new demodulator 711, an SBC band delay filter 713, and an SBC demodulator 715.

The Fc RF processor 701 receives a signal from a signal transmission apparatus, RF-processes the received signal for an Fc band, and then outputs the RF-processed signal to the Fc IF processor 703. The Fc IF processor 703 receives the signal output from the Fc RF processor 701, IF-processes the signal for the Fc band, divides the IF-processed signal into a new communication service signal and an SBC communication service signal, and outputs the new communication service signal to the new band delay filter 705 and the SBC communication service signal to the SBC band delay filter 713. The new band delay filter 705 receives the new communication service signal output from the Fc IF processor 703, delays the new communication service signal as much as the length of the CP of the new communication service signal, and outputs the delayed signal to the LBC CP remover 707.

In the meantime, the SBC band delay filter 713 receives the SBC communication service signal output from the Fc IF processor 703, delays the SBC communication service signal as much as the length of the CP of the SBC communication service signal, and outputs the delayed signal to the LBC CP remover 707.

The LBC CP remover 707 receives the signals from the new band delay filter 705 and the SBC band delay filter 713, removes CPs from the signals, and outputs the CP-removed signals to the LBC FFT unit 709. The LBC FFT unit 709 receives the signals output from the LBC remover 707, performs FFT on the signals, and then outputs the new communication service signal to the new demodulator 711 and the SBC communication service signal to the SBC demodulator 715. The new demodulator 711 demodulates the new communication service signal output from the LBC FFT unit 709. The SBC demodulator 715 demodulates the SBC communication service signal output from the LBC FFT unit 709.

Referring to FIG. 3 again, the length of the CP of the SBC communication service signal is larger than the length of the CP of the new communication service signal. Therefore, the new band delay filter 705 of FIG. 7 has a delay value corresponding to a difference between the length of the CP of the SBC communication service signal and the length of the CP of the new communication service signal, for each symbol. Further, the SBC band delay filter 713 has a delay value of "0." Further, as described above, due to the delay by the new band delay filter 705 and the SBC band delay filter 713, the new communication service signal and the SBC communication service signal have CPs of the same length. Therefore, the new communication service signal and the SBC communication service signal can be simultaneously subjected to the FFT operation, and thus only one-time FFT will be sufficient in the signal reception apparatus.

In a communication system according to the present invention as described above, when multiple signals having different frequency bands are simultaneously transmitted, a signal transmission apparatus and a signal reception apparatus proposed by the present invention can reduce the hardware complexity and can improve system efficiency and performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A signal reception apparatus in a communication system, the apparatus comprising:
   a reception unit configured to receive an incoming signal and divide the incoming signal into a first communication service signal corresponding to a first communication scheme and a second communication service signal corresponding to a second communication scheme;
   a first cyclic prefix (CP) remover configured to generate a first signal by removing a first CP corresponding to the first communication scheme from the first communication service signal;
   a second CP remover for configured to generate a second signal by removing a CP corresponding to the second communication scheme from the second communication service signal; and
   a fast Fourier transform (FFT) unit configured to perform FFT on the first signal and the second signal,
   wherein a first frequency band corresponding to the first communication service signal is different from a second frequency band corresponding to the second communication service signal, and a length of the first CP is different from a length of the second CP, and
   wherein the FFT unit has a size corresponding to a number of the first frequency band and the second frequency band.

2. The signal reception apparatus of claim 1, wherein the reception unit comprises:
   radio frequency (RF) processor configured to receive the incoming signal and RF-process the incoming signal; and
   an intermediate frequency (IF) processor configured to divide the RF-processed signal into the first communication service signal and the second communication service signal.

3. A signal reception apparatus in a communication system, the apparatus comprising:
   a reception unit configured to receive an incoming signal and divide the incoming signal into a first communication service signal corresponding to a first communication scheme and a second communication service signal corresponding to a second communication scheme;
   a first band delay filter configured to generate a first signal by delaying the first communication service signal during a first time interval;
   a second band delay filter configured to generate a second signal by delaying the second communication service signal during a second time interval;
   a cyclic prefix (CP) remover configured to generate a third signal by removing a first CP corresponding to the first communication scheme from the first signal and generate a fourth signal by removing a second CP corresponding to the second communication scheme from the second signal; and
   a fast Fourier transform (FFT) unit configured to perform FFT on the third signal and the fourth signal,
   wherein a first frequency band corresponding to the first communication service signal is different from a second frequency band corresponding to the second communication service signal, and a length of the first CP is different from a length of the second CP.

4. The signal reception apparatus of claim 3, wherein the reception unit comprises:
   a radio frequency (RF) processor configured to receive the incoming signal and RF-process the incoming signal; and
   an intermediate frequency (IF) processor configured to divide the RF-processed signal into the first communication service signal and the second communication service signal.

5. The signal reception apparatus of claim 3, wherein the second communication service signal is delayed based on a delay value corresponding to a difference between the length of the first CP and the length of the second CP.

6. A signal reception method in a communication system, the method comprising:
   receiving an incoming signal and dividing the incoming signal into a first communication service signal corresponding to a first communication scheme and a second communication service signal corresponding to a second communication scheme by a reception unit;
   generating a first signal by removing a first cyclic prefix (CP) corresponding to the first communication scheme from the first communication service signal by a first CP remover;
   generating a second signal by removing a second CP corresponding to the second communication scheme from the second communication service signal by a second CP remover; and performing fast Fourier transform (FFT) on the first signal and the second signal by an FFT unit, wherein a first frequency band corresponding to the first communication service signal is different from a second frequency band corresponding to the second communication service signal, and a length of the first CP is different from a length of the second CP, and wherein the FFT unit has a size corresponding to a number of the first frequency band and the second frequency band.

7. The signal reception method of claim 6, wherein, when the reception unit comprises a radio frequency (RF) processor and an intermediate frequency (IF) processor, receiving the incoming signal and dividing the incoming signal into the first communication service signal corresponding to the first communication scheme and the second communication service signal corresponding to the second communication scheme by the reception unit comprises:

receiving the incoming signal and RF-processing the incoming signal by the RF processor; and dividing the RF-processed signal into the first communication service signal and the second communication service signal by the IF processor.

8. A signal reception method in a communication system, the method comprising:

receiving an incoming signal and dividing the incoming signal into a first communication service signal corresponding to a first communication scheme and a second communication service signal corresponding to a second communication scheme by a reception unit;

generating a first signal by delaying the first communication service signal during a first time interval by a first band delay filter;

generating a second signal by delaying the second communication service signal during a second time interval by a second band delay filter;

generating a third signal by removing a first cyclic prefix (CP) corresponding to the first communication scheme from the first signal and generating a fourth signal by removing a second CP corresponding to the second communication scheme from the second signal by a CP remover; and performing fast Fourier transform (FFT) on the third signal and the fourth signal by an FFT unit, wherein a first frequency band corresponding to the first communication service signal is different from a second frequency band corresponding to the second communication service signal, and a length of the first CP is different from a length of the second CP.

9. The signal reception method of claim 8, wherein, when the reception unit comprises a radio frequency (RF) processor and an intermediate frequency (IF) processor, receiving the incoming signal and dividing the incoming signal into the first communication service signal corresponding to the first communication scheme and a second communication service signal corresponding to the second communication scheme by the reception unit comprises:

receiving the incoming signal and RF-processing the incoming signal by the RF processor; and dividing the RF-processed signal into the first communication service signal and the second communication service signal by the IF processor.

10. The signal reception method of claim 8, wherein the second communication service signal is delayed based on a delay value corresponding to a difference between the length of the first CP and the length of the second CP.

* * * * *